Patented Nov. 21, 1939

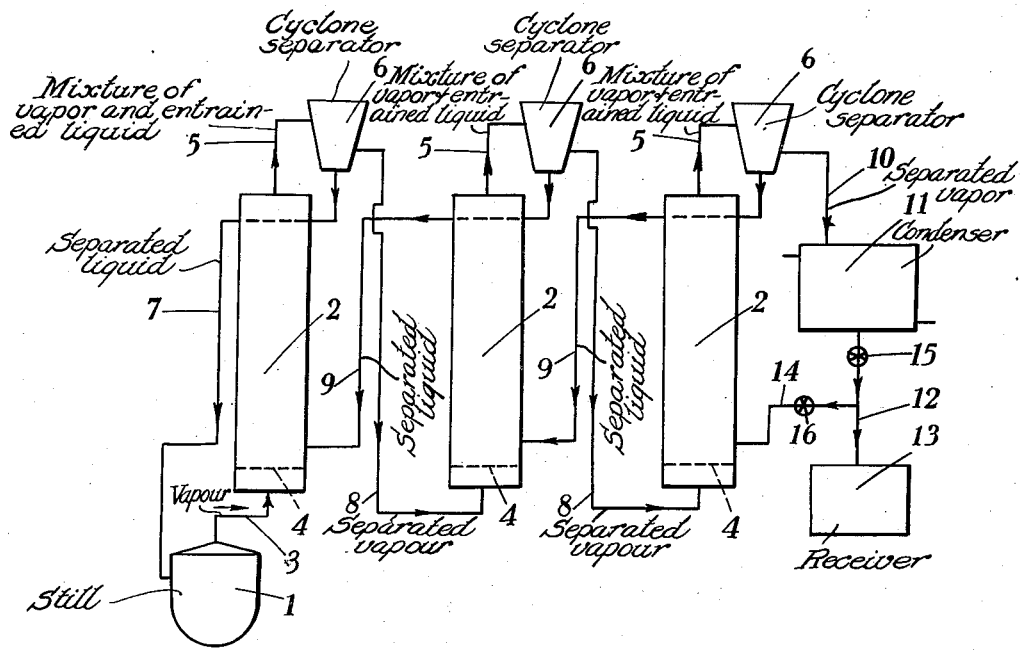

2,180,888

UNITED STATES PATENT OFFICE 2,180,888

GAS AND LIQUID CONTACT APPARATUS

Arthur Joseph Victor Underwood, London, England

Application November 4, 1935, Serial No. 48,217
In Great Britain November 10, 1934

5 Claims. (Cl. 261—21)

The present invention relates to improvements in or relating to apparatus for carrying out processes involving contacting gases or vapours with liquids such as fractional distillation, gas or vapour absorption or separation of gases or vapours from liquids and like operations such for example as gas washing.

The term "gasiform fluid" is used herein to denote a gas or vapour.

The type of plant ordinarily used in industry for fractional distillation for example, comprises a vertical column containing a number of horizontal plates at suitable distances apart. These horizontal plates are provided with perforations, bubbler caps or other devices so that the ascending stream of vapour is brought into intimate contact with the descending stream of liquid in order to establish, as far as possible, equilibrium between vapour and liquid at each successive plate or stage. A serious disadvantage of such fractionating columns is that if the velocity of the vapour through the column is increased, appreciable amounts of liquid are entrained by the ascending vapour and carried in the form of froth or droplets from each plate to the next above it. As the liquid on any plate normally contains a higher proportion of the heavier-boiling constituents than the liquid on the plate next above it, such entrainment reduces the fractionating efficiency of the column. In order to prevent excessive entrainment, it is necessary to maintain a comparatively low vapour velocity, which requires a column of large diameter, or to place the plates at relatively large distances apart so that the greater part of the drops or froth thrown up by the bubbling action of the vapour will fall back onto the plate from which they came. A high vapour velocity is also inadmissible in the present type of column, because it would result in a large pressure drop through each plate and it would then be necessary to increase the distance between the plates in order that the head of liquid in the reflux pipe should be sufficient to permit the liquid to flow by gravity from each plate to the one immediately below it. It will, therefore, be seen that the ordinary type of fractionating column has a large diameter and considerable height in relation to its output and is consequently expensive to construct.

It is an object of the present invention to provide an improved apparatus for carrying out processes of the kind set forth which is not subject to the foregoing disadvantages.

It is a further object of the present invention to provide an improved apparatus for carrying out processes of the kind set forth under pressure.

It is a further object of the invention to provide an improved apparatus for carrying out processes of the kind set forth whereby an improved and more rapid throughput can be attained.

It is a further object of the invention to provide an improved apparatus for carrying out a process of the kind set forth in a plurality of stages in which there is substantially complete entrainment of liquid by the gas or vapour at each stage but in which the mixture of gas or vapour is removed from the stage and separated and the separated liquid is returned to a stage preceding that from which the mixture is derived while the gas or vapour is passed on to a succeeding stage considered with reference to the general direction of flow of the gas or vapour.

It is a further object of the invention to provide such an apparatus in the use of which the separated liquid is returned to the next preceding stage and the separated gas or vapour is passed on to the next succeeding stage except in the case of the initial and final stages.

A further object of the invention is to provide an apparatus for carrying out processes of the kind set forth comprising a plurality of fluid contacting units or stages and means for introducing liquid on the one hand and gas or vapour on the other hand whereby substantially the whole of the liquid supplied to any unit or stage is entrained by the gas or vapour.

It is another object of the invention to provide separating means for separating mixtures of liquid and gas or vapour and means for passing the liquid back to a unit or stage preceding that from which the mixture is produced and for passing the gas or vapour on to a succeeding unit or stage.

The term "contacting unit or stage" as used herein means any suitable device or means for effecting intimate contact between a gas or vapour and a liquid such, for example, as perforated plates, bubbler plates, contacting chambers or tubes, spray jets, injectors or the like.

Thus for example, in the case of fractional distillating of a liquid, the vapour entering the first stage may be brought into intimate contact with liquid returned from a separator separating the output from a succeeding stage and so on, the vapour separated after passing the first stage being passed on to the second stage to which liquid is supplied from a separator separating liquid from a subsequent stage. In the case of a gas washing process, the operation may be similar, except that in this case the gas to be washed takes the place of the vapour and the washing liquid takes the place of the liquid under distillation.

The liquid and gas or vapour contacted in the several stages may pass in parallel flow or counterflow through the various stages.

In distillation especially, the vapours are passed through the several units or stages at a higher rate of flow than in previously used plants and this is possible without the necessity for excessive dimensions of the plant because any liquid entrained by the gases or vapours will be separated and may be returned to a previous stage. By this increased rate of flow an increased throughput can be attained whilst still preserving efficient contact of liquid and gas or vapour. It is preferred that substantially the whole of the liquid entering any one stage should be entrained by the gas or vapour and the velocity of flow of the gas or vapour may be suitably adjusted for this purpose.

Moreover it is possible to decrease the diameter of the pipes or conduits or treating chambers of the system as compared to previous systems. The invention is therefore advantageously applied in cases where it is desired to work under pressure.

Moreover if desired two or more systems each constructed and adapted to operate according to the present invention may be worked in a distillation process at different pressures, the vapour from the high pressure system or systems being employed for supplying heat to a low or lower pressure system the said vapour being preferably at the same time condensed.

Any suitable separating means may be provided such for example as cyclone separators. It will be apparent that if the separators are placed at a suitable height, the liquid reflux therefrom can be allowed to flow back by gravity to the appropriate contacting units or stages. If desired however, suitable pumps may be provided for transferring liquid, gas or vapour from the separators to the appropriate stages.

A plurality of contacting units are arranged side by side whereby the great height ordinarily required in fractionating columns, gas washers and the like can be avoided as well as the heavy construction and massive foundations entailed thereby.

In order that the invention may be well understood a preferred embodiment thereof will now be described by way of example only with reference to the accompanying drawing in which:

The figure is a diagrammatic view of one form of distillation plant according to this invention.

Referring to the drawing, the apparatus comprises a still 1 and a plurality of identical fluid contacting chambers or units 2. Whilst in the drawing only three such chambers have been shown, it will be understood that any desired number of such chambers may be employed. The still 1 which is provided with suitable heating means (not shown) is connected by a vapour line 3 to the base of the first chamber 2. Above the point of entry of the pipe 3 into the chamber 2 is a perforated plate 4 through which the vapours from the still 1 must pass to entrain liquid supplied above the plate 4 in a manner hereinafter described. The said chamber 2 is connected at the top by means of a pipe 5 with a cyclone separator 6. At the base of the separator 6 a pipe 7 leads to the still 1 for returning separated liquid thereto. The vapour outlet of the separator is connected by means of a pipe 8 with the bottom of the second chamber 2. From the top of the second chamber there is as before a pipe 5 communicating with a second separator 6, the vapour outlet of which communicates by means of a pipe 8 with the bottom of the third chamber 2. The liquid outlet at the base of the second separator 6 communicates by means of a pipe 9 with the first chamber near the bottom but above the perforated plate 4 therein. If desired of course the pipe 9 can enter the first chamber 2 higher up in which case, further perforated plates and/or bubbler plates or the like may be provided or any suitable baffles, packing or the like may be employed instead of or in addition to the perforated plate or plates. Moreover if desired a pump may be inserted in the pipe line 9 if the gravity pressure drop in the line is not sufficiently great. The vapour outlet from the second separator 6 is connected as before by means of a further pipe 8 to the base of the third chamber 2 and this is connected to a third separator 6 by means of a pipe 5. The liquid outlet from the third separator is connected by pipe 9 to the second chamber 2. The vapour outlet from the third separator 6 is connected by means of a pipe 10 to a condenser 11 which is connected by means of a pipe 12 to a receiver 13. A branch pipe 14 leads from the pipe 12 to the third chamber 2 near the bottom but above the plate 4 and regulating cocks 15, 16 are provided in the pipes 12, 14.

The operation of the plant is as follows: Vapour produced in the still 1 enters the first chamber 2 through the pipe 3. There it meets liquid entering the chamber above the plate 4 through the pipe 9 from the second separator 6. The velocity of flow of the vapours is preferably such that substantially the whole of the liquid entering the chamber is entrained by the ascending vapour. The mixture of liquid and vapour so produced enters the first separator 6 through the pipe 5, and the liquid is separated from the vapour and is returned to the still 1 through the pipe 7. The vapour separated in the first separator 6 passes to the second chamber 2 through the pipe 8 and there it meets and entrains liquid supplied from the third separator 6. The mixture of liquid and vapour passes to the second separator 6 from which the liquid is returned by the pipe 9 to the first chamber 2 and the vapour is passed on to the third chamber 2. Here the vapour meets and entrains liquid supplied from the condenser 11 through the pipes 12, 14. The liquid separated in the third separator is returned to the second chamber and the vapour is passed on to the condenser 11 where it is condensed and passed to the receiver 13 with the exception of a part which is drawn off through the pipe 14 to provide liquid for the third chamber. The proportion of liquid drawn off through the pipe 14 can be regulated by means of the cocks 15, 16.

Obviously if desired the reflux from the third separator could be returned to the first chamber, and so on or any other desired connections could be made between the various separators and the various chambers.

A similar apparatus could be employed for washing gas. In that case the pipe 3 would be connected to a suitable gas supply, the pipe 7 could be connected to waste or storage, the pipe 10 to a suitable storage and the pipe 14 to a supply of washing liquor.

Whilst an embodiment of the invention has been described by way of example as applied to a fractional distillation plant, it will be apparent that the invention is also applicable to other apparatus for contacting gases or vapours with liquids.

Whilst an embodiment of the invention has been described by way of example as applied to a fractional distillation plant it will be apparent that the invention is also applicable to other fluid contacting processes for example gas washing or absorption processes. The invention is also applicable to processes for contacting two immiscible or partially miscible liquids and in that case mechanical means such as pumps may be provided for transporting one or both of the liquids through the system. Moreover the invention is applicable to parallel flow systems and methods as well as to counterflow methods and systems.

I claim:

1. Apparatus for carrying out processes of the kind described comprising a plurality of contacting chambers arranged at the same level for contacting liquid and gasiform fluid, means for supplying gasiform fluid to the first chamber, means for supplying liquid to the last chamber, an outlet from each chamber for a mixture of liquid and gasiform fluid, a plurality of separating means, an inlet to each separating means, the inlets of the separating means being connected respectively to the outlets of the chambers, an outlet from each separating means for liquid, an inlet to each chamber for liquid, the liquid outlet from the second separator being connected to the liquid inlet of the first chamber and so on, an outlet from each separator for gasiform fluid, an inlet to each chamber for gasiform fluid, the gasiform fluid outlet from the first separator being connected to the gasiform fluid inlet of the second chamber and so on, each separating means being located at such height above the liquid inlet to the chamber connected to it that with complete entrainment of the liquid in the chamber the liquid can fall by gravity from the separating means to the chamber.

2. Apparatus for carrying out processes of the kind described comprising a plurality of contacting chambers arranged at the same level for contacting liquid and gasiform fluid, an inlet to each chamber for liquid, an inlet to each chamber for gasiform fluid, an outlet from each chamber for mixture of liquid and gasiform fluid, a plurality of mechanical separators connected respectively to the outlets of said chambers, an outlet from each separator for liquid connected to the liquid inlet of a chamber preceding that from which the separator receives its supply and an outlet from each separator for gasiform fluid connected to the gasiform fluid inlet of a chamber succeeding that from which the separator receives its supply considered with reference to the general direction of flow of the gasiform fluid, means for supplying gasiform fluid to the first chamber and means for supplying liquid to the last chamber.

3. Apparatus for carrying out processes of the kind described comprising a plurality of chambers arranged at the same level, fluid spreading means in said chambers, an inlet for liquid to each chamber above said fluid spreading means, an inlet for gasiform fluid below said fluid spreading means, an outlet for gasiform fluid and entrained liquid above said fluid spreading means, a mechanical separator for each chamber connected on the inlet side to the outlet from the corresponding chamber, an outlet from each separator for liquid, an outlet from each separator for gasiform fluid, the liquid outlet from each separator, except the first, being connected to the liquid inlet of the chamber preceding the one from which it is supplied and the gasiform fluid outlet from each separator being connected to the gasiform fluid inlet of the next succeeding chamber, means for supplying gasiform fluid to the first chamber and means for supplying liquid to the last chamber considered with regard to the direction of flow of the gasiform fluid.

4. Apparatus for fractional distillation comprising a still, a vapour outlet therefor, a liquid inlet therefor, a plurality of liquid vapour contacting chambers arranged at the same level, an upper inlet for liquid to each chamber, a lower inlet for vapour to each chamber, an outlet for liquid vapour mixture for each chamber, a plurality of cyclone separators corresponding in number to the number of chambers, an inlet to each separator, a vapour outlet from each separator, a liquid outlet from each separator, a condenser, the mixture outlet of each chamber being connected to the inlet of the corresponding separator, the vapour outlet of each separator except the last being connected to the vapour inlet of the next succeeding chamber, the liquid outlet from each separator, except the first, being connected to the liquid inlet of the next preceding chamber, the liquid outlet from the first separator being connected to the still, the vapour outlet of the last separator being connected to the condenser and the liquid inlet of the last chamber being supplied with condensate from the condenser.

5. Gas washing apparatus comprising a plurality of liquid and gas contacting chambers arranged at the same level, a corresponding number of mechanical separators, means for supplying gas to the first chamber, means for supplying liquid to the last chamber, means for transferring a mixture of gas and entrained liquid from each chamber to the corresponding separator, means for transferring gas separated from each separator except the last to the next succeeding chamber, and means for transferring liquid from each separator, except the first, to the next chamber preceding that from which the separator receives its supply.

ARTHUR JOSEPH VICTOR UNDERWOOD.